UNITED STATES PATENT OFFICE.

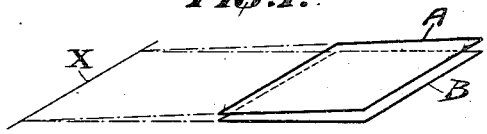
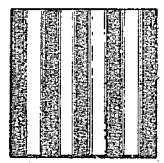
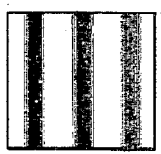
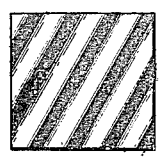
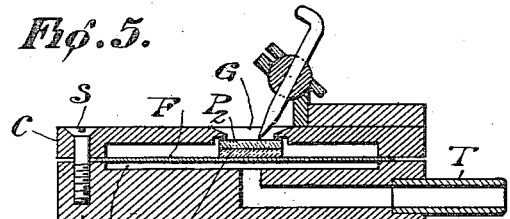
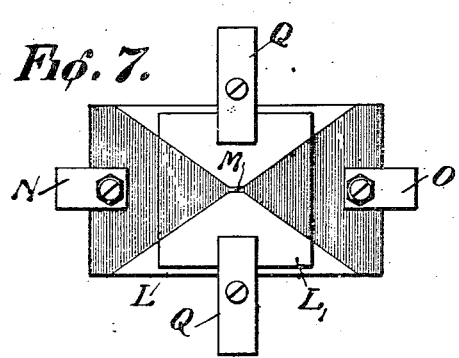
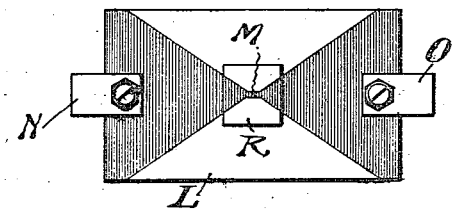

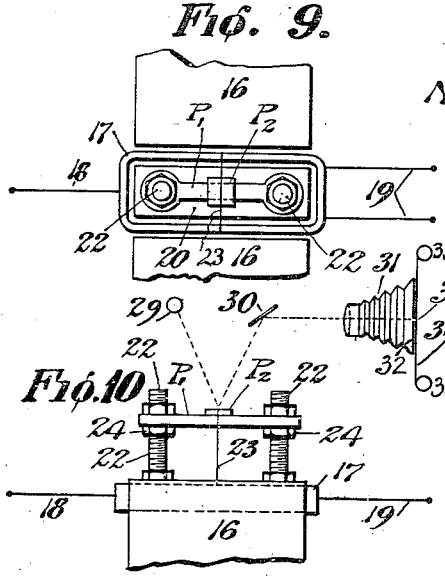
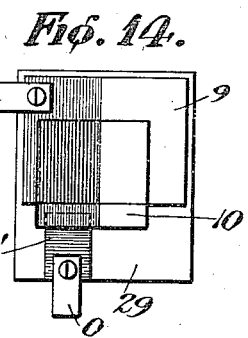
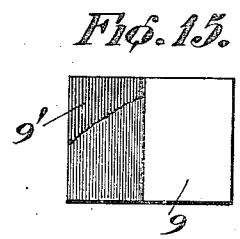
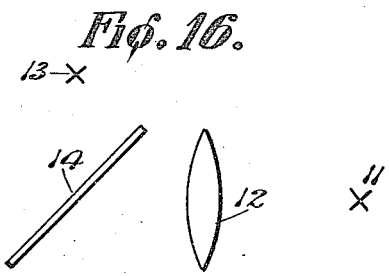
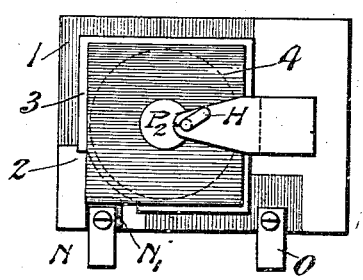
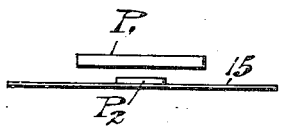
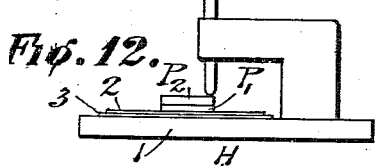
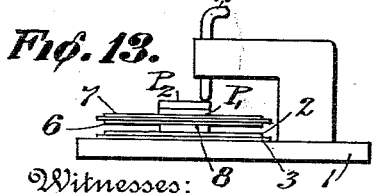
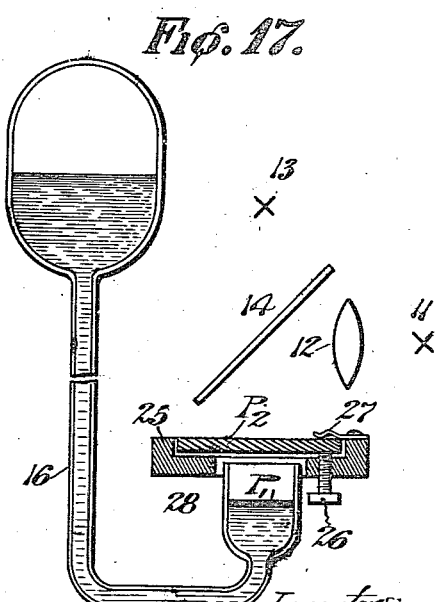

ALBERT C. CREHORE, OF YONKERS, NEW YORK, AND GEORGE O. SQUIER, OF WASHINGTON, DISTRICT OF COLUMBIA.

METHOD AND APPARATUS FOR DETECTING AND OBSERVING FORCES.

1,044,502.

Specification of Letters Patent.   Patented Nov. 19, 1912.

Application filed October 13, 1910.   Serial No. 586,889.

*To all whom it may concern:*

Be it known that we, ALBERT C. CREHORE, of Yonkers, New York, and GEORGE O. SQUIER, of Washington, District of Columbia, citizens of the United States, have discovered and invented a new and useful Method and Apparatus for Detecting and Observing Forces; and in order that others may understand and practice our invention we give the following specification, reference being had to the accompanying drawings, forming part thereof.

Our invention relates to detecting and observing forces and variations or changes therein, whether such forces be manifested mechanically, electrically, magnetically, by heat, or in other ways; and the object of our invention is to provide a method and means whereby the operation, changes or variations of forces, even of a most delicate character and minute degree, may be made observable and measurable, and recorded if desired.

A further object of our invention is to provide a method and means by which force manifestations at present practically perceptible only to the ear, or even imperceptible, may be made observable to the eye, or simultaneously to both eye and ear.

It may be stated preliminarily that, as some form of matter must, in most cases, be moved by the agency of the force to be observed to make the existence or action of the force known, the detection or observation of a force is limited by the ability of the human senses to perceive movements of the form of matter used to manifest the existence or operation of the force. The limitations of human sense perceptions are well recognized, whereby changes or operations of forces of a delicate or minute character or extremely high or low rapidity are either not perceived at all, or so imperfectly perceived as to serve no useful purpose. Besides, in many instances, the mass which must be moved in order to perceive the force is disproportionate to the force acting thereon, so that the observations are either impaired by reason of inertia, or the motion produced is too slight for accurate observation or detection. Our invention provides a method and means whereby the perceptibility of forces and changes therein may be greatly extended and improved, the mass to be moved reduced, and extremely small movements made readily observable.

In carrying out our invention we make use of the phenomena of light interference; that is, the interference of light waves which is shown by various optical effects according to the means used for producing the same,—such as interference fringes or bands, Newton's rings, diffraction fringes or spectra, of great sensitiveness to changes or movements in the instrumentalities or means employed for their production. Various means may be employed for producing these interference phenomena, such as optically thin or thick plates, suitably arranged reflection surfaces, gratings, and the like. For the purposes of our present application, however, we shall describe only the simpler and more readily employed means and those giving the fringes in the form of bands of straight, curved or irregular contour, and circles or rings.

We have illustrated our invention and the manner of employing the same in the accompanying drawings, of which—

Figures 1 to 4 inclusive are diagrammatic representations of means for producing interference fringes or bands and the changes shown therein under described conditions. Fig. 5 illustrates a form of apparatus in cross section for observing a force operating mechanically or magnetically. Fig. 6 is a copy of a photographic record of a force action as exhibited by the apparatus shown in Fig. 5. Figs. 7 and 8 illustrate similar forms of apparatus for observing forces operating to produce temperature change or heat effects. Figs. 9 and 10 illustrate in plan and elevation respectively an apparatus for observing a force producing motion in a magnetic field. Figs. 11 to 15 inclusive are views illustrating forms of apparatus for observing forces operating in an electric field or electrostatically. Fig. 16 illustrates a form of apparatus for producing interference phenomena in the form of circular fringes and for the observation of forces thereby. Fig. 17 illustrates a special application of the form of the invention illustrated in Fig. 16.

We shall first describe the production of interference fringes or bands from thin plates represented by reflecting surfaces in close proximity or substantially in contact, and the method and means for practically utilizing the same. If a plate of glass A, Fig. 1, be laid upon a second plate B of glass or any other substance having a surface that will reflect light, brilliant bands, alternately light and dark, will be seen if the source of light be monochromatic,—such for instance as emitted by a sodium flame. If the lower plate be opaque, the bands may be seen by reflection through the upper plate; if both plates be of transparent glass, the bands may be seen by reflection through either plate and may also be seen by transmission with the plates between the source of light and the eye. If the source of light be composite, such as sunlight, the bands appear colored; but as such bands are not so well defined nor so easily produced as those obtained with monochromatic light the latter is preferably employed for most purposes. The light and dark bands so produced are diagrammatically illustrated in Fig. 2. If the contiguous surfaces of the two plates are optically plane, and the upper plate rests by its own weight upon the lower plate, the bands are usually formed in straight lines. The bands or fringes may be produced by using ordinary window glass, but this gives fringes which are curved in various ways—showing that the reflecting surfaces are not plane. The geometrical character of the surfaces can be determined by observing the contour of the curves which the bands exhibit. The more nearly parallel to each other the plane surfaces become, the greater the distance between the bands. The two contiguous reflecting surfaces form the sides of a wedge having a very small acute angle, and the edge of this wedge where the planes intersect is a line parallel to the bands. In Fig. 1 the edge of the wedge may be represented as at X.

If pressure be applied to some point of the upper plate so as to press the two plates nearer together (they being separated by the intervening film of air) two distinct effects are generally produced:—The angle of the wedge is not only altered, but the edge of the wedge is shifted or rotated through a considerable angle. These changes affect the bands each in its own way: the first broadening them and increasing the distance between adjacent bands, the second rotating the whole system of parallel bands by the same angle by which the edge of the wedge is shifted or rotated. The first of these effects is illustrated in Fig. 3, where the bands are represented as broadened and at greater distance apart than in Fig. 2; and the second is represented in Fig. 4, where the angular position of the bands is changed from that shown in Fig. 2. When the pressure on the plates is relieved the bands resume or approach their initial position. In this manner a system of oscillatory bands or fringes is produced which may be made to exhibit or detect changes in forces in the manner herein explained.

We have applied the foregoing principles to the observation and detection of forces operating in various ways, and in the following are described means and devices for practically applying and utilizing these principles.

*I. Forces operating mechanically.*—In Fig. 5 is illustrated an instrument for observing, detecting or measuring small changes of pressure. A casing of metal of other suitable material is conveniently formed of two parts C and D recessed on their opposing faces to form a small chamber E. This chamber is provided with a tubular outlet T. Clamped between these two parts is a diaphragm F, the clamping means being represented by the screws S. The casing and diaphragm are preferably circular in shape. At the center of the diaphragm F is cemented, or otherwise secured, a piece of plane optical glass $P_1$, and upon this rests by its own weight a similar plate $P_2$. The observer looks into this instrument through the sight aperture G in the upper part C and sees the light, from some convenient monochromatic source, reflected from the two glass plates. The interference bands show clear and distinct and are substantially straight. Any change of pressure within the chamber F, which may contain air or other fluid, deflects the diaphragm—the pressure without the chamber, as of the atmosphere, being constant. The deflection of the diaphragm carries with it both plates $P_1$, $P_2$ either up or down according as the pressure in chamber F is increased or diminished. If the upper plate $P_2$ be held relatively stationary so as to cause a relative movement between the plates in response to the movements of the diaphragm, a corresponding movement of the bands occurs. Such relative movement of the plates is preferably obtained by providing an adjustable pointer H to make contact with a point on plate $P_2$. This pointer is mounted in a ball and socket joint on the upper part C, the pointer sliding friction tight in the ball J adjustably held in socket K. In adjusting this pointer in contact with plate $P_2$ the bands change to a new position at the first contact and remain there so long as the pressure of the pointer on the plate is not varied. For a given setare observed from the opposite side of the silvered plate. With gutta percha for the upper plate the sensitiveness is increased and 0.0014 watts caused a motion of the bands.

The upper plate, instead of being held to the lower plate by clamps, as described, may merely rest of its own weight thereon and an increase of sensitiveness obtained. A pointer as previously described may be used if desired.

Another form of the instrument is illustrated in Fig. 8. In this form of the instrument a piece of mica R, as nearly plane as possible, about 1 cm. square and .0075 mms. thick, is pressed against the lower plate so as to cover the neck. In this condition the mica adheres to the glass and is not easily displaced. Brilliant bands are formed showing various curved contours. With such plates there generally occur two kinds of critical points—one elliptical and the other hyperbolic in character. The points of contact are at the centers of the elliptical areas, and the points of greatest separation at the centers of two sets of curves hyperbolic in character. Any motion is most apparent at these points, and sensitiveness is increased by moving the mica plate over the neck so as to bring one of these critical points into its neighborhood. As an illustrative test, made by cutting the neck across with a knife edge and placing powdered graphite in the incision, the following is given; resistance 129 ohms, power 0.000113 watts. The increased sensitiveness is due to the small mass of the mica plate resting without clamps by its own weight upon the glass plate. The mica, being easily flexed and not plane, exhibits individual peculiarities. The above instruments may be used as electrical current detectors or ammeters.

*III. Forces operating magnetically.*—The principle of our invention may also be applied to detect and observe changes in a magnetic field. This may be done by mounting the glass plates upon an iron diaphragm acted upon by a magnetic field as in the ordinary telephone receiver. This is done in a manner similar to that illustrated in Fig. 5, the diaphragm F therein corresponding to the diaphragm of the telephone receiver, but in this case acted upon by variations in the magnetic field instead of by variations of air pressure. As illustrative of the degree of sensitiveness obtained by using a telephone optically in this manner we give the following: resistance 620 ohms, current $1.26 \times 10^{-6}$ amperes, E. M. F. 0.00077 volts, power $9.8 \times 10^{-10}$ watts. A telephone used optically in the manner described is applicable to wireless telegraphy by merely removing the telephone commonly used for receiving the signals and substituting the "optical telephone" above described in its place without making any change in the arrangement of the circuits. Wireless messages have been received and read in this way by observing the movements of the bands. If desired both the ordinary audible telephone and our "optical telephone" may be used simultaneously by connecting them in the same receiving circuit, thus permitting the observer to both see and hear the same wireless signals at once. The advantage of making such signals perceptible by two physiological senses will be apparent—the impressions received by one being checked or verified by those received by the other. The bands move in response to signal impulses received from the transmitting station. When no signal is being sent the bands remain at rest in a given fixed position. When a signal arrives the bands shift quickly to a new position, dependent upon the energy of the received signal, and remain in the new position until the termination of the signal. Dots and dashes are thus easily read.

It should be borne in mind that the telephone receiver is designed specially to produce sounds perceptible to the ear, whereas, for the purposes of our invention it is desired to produce only such movement as will be made visible by changes in the interference bands. The principle involved is the obtaining of a maximum displacement of the bands for a minimum of applied energy. With an instrument specially designed to give visual responses to the received signals or impulses much greater sensitiveness may be obtained. For example, a marked increase of sensitiveness has been obtained by no more than a redistribution of the iron in the diaphragm, such as increasing its thickness at the center.

The device described is useful also for the observation or measurement of alternating currents of low frequencies. Frequencies below about 20 cycles are not audible; but with our "optical telephone" the range of observation is extended to infra-sounds or frequencies such as are required in ocean cable telegraphy.

In Figs. 9 and 10 we have shown our invention applied to an ocean cable receiver of the type known as the siphon recorder and in general use. Only so much of the receiver is shown in the drawing as is necessary to illustrate how our invention has been applied thereto. In applying our invention to this instrument the siphon and rocker mechanism are removed. The pole pieces of the field magnet are represented at 16, 16. Between these pole pieces is the coil 17 supported by the bifilar suspension fibers 18, and 19, 19. These fibers, as will be understood, are connected by one end of each to the ends of the coil 17—two at one end and one at the opposite end of the coil—to form ting of the pointer an increase of pressure in the chamber F increases the pressure between the glass plates. The pointer localizes this pressure at one point of the upper plate and produces the changes in the bands as stated. The bands broaden out and their direction revolves through an angle dependent upon the amount of increase of pressure. If the pressure in chamber F is made to increase and decrease, the system of bands oscillates in phase with the pressure changes. In exploring the plate with the pointer for an initial setting it is found that there are certain critical points on the plate where the sensitiveness of the instrument is much greater than at other points, and particular areas are more sensitive to minute changes than the remainder of the plate. By ascertaining in this way the critical points or areas it is easy to obtain an angular motion of the bands of 180° for small changes in the adjustment of the pointer.

It will be apparent that an instrument of the character described is useful for a variety of purposes. As illustrated it has been successfully used for observing and recording the pulsations or action of the human heart. For this purpose it was connected to the rubber tube of an ordinary stethoscope placed on the pulse at the wrist, the rubber tube of the stethoscope being connected to the outlet T of the instrument shown. Sufficient change of air pressure was thus produced in the chamber F to oscillate the bands through a large angle. By this means the heart action may be observed visually, and by connecting the stethoscope by an additional rubber tube to ear pieces both visual and auditory observation of heart action may be made at the same time. A photographic record may be made of the observations obtained by the bands by reflecting the same from a suitably placed mirror into a photographic camera provided with means to move the photographic plate past a slit through which the image of the bands is reflected. Fig. 6 is a copy of a photograph so obtained from the device described as used to observe heart action in the manner stated. When a photographic record is to be made of the movements shown by the bands we have found that the preferable source of light is the ordinary commercial mercury vapor electric lamp, which while not purely monochromatic produces very distinct bands, and is well adapted for photographic purposes, giving good results with ordinary photographic plates. The utility and value of a device of the character described to physicians and others will be apparent; but it is to be understood that it is not limited to the observation and recording of physiological phenomena, and that it may be used as well for other purposes in which the force to be observed may be made to effect changes of pressure or relative movement between the plates $P_1$, $P_2$. For example, the force to be observed may be made to act through mechanical means such as levers, or through incompressible fluids or solids to vary the pressure on the said plates or to produce relative movement thereof and responsive changes in the bands. Temperature changes may also be observed by means of the instrument described by causing the temperature change to vary the pressure of the air or other suitable medium in chamber F. By placing the instrument in a vacuum or rarefied atmosphere, thus reducing the external pressure its sensitiveness to vibration may be increased. It is also pointed out that not only may changes of forces be observed by means of the instrument described, but the time rate of the changes may also be observed by means of the photographic record described, by giving the photographic plate a known uniform rate of movement past the slit.

*II. Forces operating by heat.*—An electrical apparatus for observing or detecting forces operating by heat is illustrated in Fig. 7, in which L, $L_1$ represent two plates, which may be of ordinary glass. The lower plate L is first silvered over its whole surface, the portions shown by the unshaded areas being subsequently removed. The remaining silvered portion, indicated by the shaded area, includes the narrow neck or bridge M joining the larger silvered areas. Electric terminals N and O are connected at the opposite ends of the plate to the silvered portion. The upper plate $L_1$ is held by clamps Q, Q upon the lower plate so as to cover the neck portion M, leaving an area for observing the interference bands between the plates. These appear throughout the entire surface of the upper plate, but are less brilliant over the silver. Upon passing an electric current between the terminals N, O, the heat developed is localized in the narrow neck M at the center of the plates. At this point the glass of both plates expands, causing a small elevation on each plate, forcing them apart and thus shifting the interference bands. The following are given as illustrative of the results obtained with the device described: With a resistance of 51 ohms between the terminals, 0.18 watts caused an observable movement of the bands: with a resistance of 1800 ohms at the neck 0.16 watts moved the bands approximately the same as in the first instance. The sensitiveness of the device is limited by the coefficients of expansion of the silver and glass. With an upper plate of hard rubber in place of glass, 0.005 watts produced a motion of the bands, the resistance being 50 ohms, current 10 milliamperes. When, as in this case, an opaque substance like hard rubber is used in place of glass, the bands a three-point suspension; the other ends of the fibers being connected to the frame of the receiver (not shown). By this means the coil is maintained in normal position and returned thereto after oscillation in response to the received signals. The coil surrounds an inter-pole piece 20 which confines the air gap in the magnetic circuit to the minimum necessary to accommodate the coil. In applying our invention to a receiver of this character, after removing the siphon and rocker apparatus as stated, we provide a support for the means for producing the interference bands. As shown two threaded rods or standards 22, 22 are secured in the inter-pole piece 20. On these standards is adjustably supported a plate $P_1$ of glass or other material having an upper reflecting surface. This plate is narrowed at its middle portion whereon is laid a glass plate $P_2$ slightly wider than the lower plate $P_1$. The interference bands will be seen through this plate viewed from above, as heretofore described. A filament or fiber of non-conducting material 23, such as silk, is secured by one end to one side of the coil 17 and is led up over the upper plate $P_2$ and down to the opposite side of the coil where it is secured. The upper plate being slightly wider than the lower plate enables the filament to clear the latter. The tension of this filament may be adjusted by the adjusting nuts 24, 24 on which plate $P_1$ rests. When the coil 17 is energized in response to received signal impulses, its torque is transmitted through the filament 23 to the plate $P_2$ thereby causing a responsive movement or change in the interference bands, by observation of which the signals may be read. Or, if a record is desired, the movements of the bands may be photographed on a tape in a manner similar to that heretofore described, the apparatus therefor being illustrated in Fig. 10. The preferable source of light is a mercury vapor lamp 29; 30 is a mirror arranged to reflect the bands produced at the plates $P_1$, $P_2$ into a camera 31, suitably supported to receive the image of the bands from said mirror, and having a screen 32 provided with a narrow slit 33 upon which the image of the bands is focused. The sensitive surface is shown in the form of a tape 34 suitably mounted on spools 35—35, one of which may be suitably driven to feed the photographic tape 34 at desired speed past slit 33. Important advantages are obtained by the application of our invention in a cable receiver of the character indicated. In the siphon recorder as at present used the coil is required to swing through a considerable angle in receiving messages. This sets up a counter E. M. F. in the coil opposed to the force producing its motion. The effect of this is to produce a damping of the coil oscillations, which increases with increase of field strength. This damping effect becomes so great in practice that the field strength which it is practical to use is restricted to a comparatively low value. As the sensitiveness of the instrument is directly proportional to the strength of field of the magnet, this inherent defect of the siphon recorder operates to limit its sensitivity, and therefore the speed at which the messages may be received. Furthermore the inertia of the moving system, including both coil and siphon apparatus also prevents receiving faster than a certain limiting speed. These defects are overcome by our invention, by which the motion of the coil is reduced to an infinitesimal degree which is nevertheless plainly observable in the movements of the bands. The disadvantages of the siphon instrument due to the counter E. M. F. developed in the coil as above explained are eliminated by our invention which makes it possible to use an electromagnet with a more powerful field in place of the permanent magnet of weaker field at present used, and thereby obtain increased sensitivity.

*IV. Forces operating electrically.*—Our invention may also be applied to the detection, observation or measurement of changes in electromotive force and of energy. In Figs. 11, and 12 is shown a form of instrument for this purpose which may be termed an electrostatic voltmeter, and since it operates on the principle of an electrical condenser it may also be termed an "optical condenser". This form of instrument comprises a glass plate 2, which may be 25 mms. square, by about .125 mms. thick or of other suitable dimensions; and a second plate 1. Each plate is silvered on one side, the silvered sides being turned toward one another. The silvered portion of the lower plate is indicated by the shaded area, the silver being removed at the unshaded area. Interposed between these plates is a sheet of insulating material 3 such as paper, mica or the like having a circular opening 4. This insulating sheet separates the thin glass plates by a distance of about .05 mms., forming an air film between the silvered surfaces of the glass plates at their central portion. Electric terminals N, O are connected respectively to the silvered surfaces of the two plates. The terminal N for the upper plate may be connected by a strip of tin foil $N_1$ secured to the silvered surface of that plate near the edge, a portion of the sheet 3 being removed to accommodate it. The outer end of the foil strip may then rest upon a clear portion of the lower plate at which the silver has been removed, as shown. The lower plate thus forms a support for the foil strip and the terminal for the upper plate. Upon the upper plate 2 are placed two optically plane glass plates $P_1$, $P_2$ one resting on the other. An adjustable pointer H, supported in a standard or arm 5, is in contact with upper plate $P_2$ so as to localize and produce relative movement of the two plates $P_1$, $P_2$. The operation of the device will be apparent. The two opposed silver surfaces of the plates 1 and 2, when connected in circuit, form a condenser. As illustrating the results obtained from the device described we give the following: A change of potential difference between the silvered plates from 0 to 20 volts will produce a movement of the bands at plates $P_1$, $P_2$. If an initial electrostatic field or voltage be provided, the sensitiveness is much increased: thus a change from 106 to 108 volts between the plates will produce an appreciable motion of the bands. The sensibility being proportional to the difference of the squares of the electric fields, the change in the first case gives 400 as the difference of the squares, and in the second case 428, which values are within the errors of observation. While the sensitiveness indicated above is not remarkably high when applied to measuring small voltages, the energy required to produce a motion of the bands is a small quantity. The computed capacity of the condenser described is .000085 microfarads, and the energy .108 ergs. This is, roughly, equal to the work of raising one milligram one millimeter.

In Fig. 13 is illustrated another form of this instrument in which a plurality of condensers are arranged in the form of a pile forming what may be termed an "optical condenser pile." This form of device is the same in form and arrangement as that shown in Figs. 11 and 12, except that an additional pair of condenser plates 6 and 7 are superposed on the first pair 1 and 2, the upper pair being carried on a small block 8 centrally located. An amplification of the displacement of the bands is secured by this arrangement, and the sensitiveness obtained is practically twice that obtained with one pair of condenser plates. The extent to which the condenser units may be multiplied to advantage in this manner is dependent upon the mass of the moving parts.

A similar device but of greater volt-sensitivity is illustrated in Figs. 14 and 15. A plane glass plate 9 is silvered on its upper surface and one half the silver coating removed. The shaded area represents the silvered portion. A thin glass plate, 10, of about .125 mms. thickness is prepared in the same manner. A thin coat of lacquer is then baked on one of the silver surfaces, the lacquer coat being represented at 9' Fig. 15. The thin plate 10 is then superposed on the other plate 9, with the silvered and unsilvered portions opposed to the silvered and unsilvered portions, respectively, of the lower plate. The interference bands are seen at the unsilvered area, although the glass surfaces are separated by the thickness of the two coatings of silver and one of lacquer. For convenience in connecting this instrument in an electric circuit it may be supported on a glass plate 29, the silvered area of the lower plate 9 being connected in the circuit to the terminal screw N. The silvered area of the upper plate 10 is connected to the other terminal O by means of a strip of tin foil O' secured to the silvered surface of the plate 10 the edge of which is allowed to project over the edge of the lower plate 9 for that purpose. The terminal O and tin foil strip O' are clamped to the supporting plate 29. As an illustration of the sensitiveness of this form of instrument it has been found to show a response to a change of potential difference between the opposed silver areas from 0 to 3.4 volts.

The classifications or headings given above of the different modes of operation of forces have been employed as a matter of convenience for use in describing the invention and are obviously not to be regarded strictly or as absolute, since in many cases a force may operate in more than one manner. For instance under the description of forces operating by heat, the heat effect is indirect, being produced by the electric current, so that the force may be also said to be operating electrically—one form of energy being convertible into another.

*Interference fringes of circular form.*—In the foregoing we have described the principles and application of our discovery as exhibited in fringes or bands obtained from reflecting surfaces in close proximity or substantial contact. The principles of our invention may also be exhibited and applied in the form of circular interference fringes or rings obtained by reflections from plane parallel reflecting surfaces or mirrors separated a considerable distance apart. A form of instrument using this form of interference phenomena is illustrated in Fig. 16, in which $P_1$ and $P_2$ represent the plates or surfaces by which the fringes are produced. As illustrated they are separated a considerable distance apart. Plate $P_1$ is a mirror, which may be formed of a glass plate thickly silvered on its upper surface, the silver coating being, preferably, polished. Plate $P_2$ is thinly silvered on its lower side so as to form a semi-transparent mirror. A source of monochromatic light is represented at 11, the light being projected through a lens 12 on to a glass plate 14 arranged at an angle of 45°, whence a portion of it is reflected downward through the semi-transparent mirror $P_2$ on to the silver surface of plate $P_1$. Thence it is reflected vertically upward, part of the light passing through the semi-transparent mirror $P_2$ and part being reflected back again to $P_1$. The former portion passes directly to the eye of the observer at 13, while the latter portion goes over the same course after reflection between the two plates. When the two plates $P_1$, $P_2$, are adjusted to parallelism, circular fringes or rings are perceived by the observer at 13 looking downward into the plates $P_1$, $P_2$. To utilize the device a body, for example a telephone or other diaphragm 15, actuated by the force to be detected or observed is made to impart its movements to one of the plates, $P_1$, as by mounting said plate thereon, as shown. The observer sees a system of well-defined concentric rings which expand or contract as the distance between the plates changes, the central spot becoming alternately light and dark. If an alternating current of low frequency be made to vibrate the diaphragm 15, the fringes or rings alternately expand and contract visibly. As the frequency is increased the motion of the fringes becomes so rapid that the whole field may appear uniformly illuminated as a result of the persistence of vision. At a frequency of 30 cycles some traces of motion may be seen, but at about 60 cycles the field appears uniform if the current is sufficiently large. When used as a telegraph receiver for alternating currents, the dots and dashes are read by noting the appearance and disappearance of the rings,—no apparent motion of them being seen by the unaided eye, but merely their presence or absence. With low frequency currents of about four or five cycles per second, such as are employed in submarine cable telegraphy, the movements of the fringes may be followed by the eye, or recorded photographically. In using this form of our invention care should be taken to exclude external sounds and prevent accidental shaking or vibration from reaching the instrument which would disturb the diaphragm and the fringes, as even talking in the room will produce a motion of the fringes. This effect, however, is not experienced in the forms of the invention heretofore described with the plates in contact. With the form of the invention now being described, the fact that the diaphragm is perfectly free to vibrate, (contact and pressure between the plates being absent), makes this form of the invention very sensitive to alternating currents. Furthermore, if desired, the diaphragm may be placed *in vacuo* and the air resistance to its vibrations eliminated. This form of the invention may be applied to observing changes operating through a wide range or producing a wide range of movement in the body or form of matter which is actuated by the force to be observed. This is for the reason that in this form of the invention the interference phenomena produced is not determined by the reflecting surfaces being contiguous or in substantial contact. In Fig. 17 this form of the invention is illustrated in its application to observing changes of atmospheric pressure as shown by the barometric column. The arrangement of the mirrors or reflecting surfaces and their character are the same as that above described and shown in Fig. 16, except that the lower reflecting surface or mirror $P_1$ in Fig. 16 is formed by the surface of the mercury in the open or lower end of the barometer tube 16. It will be apparent that this surface is self-adjusting to horizontal level. The barometer tube may be supported in any convenient and suitable manner with its open end brought in registry with an aperture 28 formed in a suitably supported frame or platform 25. The upper plate or semi-transparent mirror $P_2$ is supported in this platform or frame 25 upon leveling screws 26 which should be at least three in number, only one being shown in the drawing for the sake of clearness. The plate $P_2$ is held in contact with and caused to closely follow the adjustment of the screws by means of spring fingers or clips 27 bearing upon the upper surface of the plate at its periphery. As will be understood the plate $P_2$ will be adjusted to parallelism with the surface of the mercury $P_1$ in the open end of the barometer tube. In order to obtain a proportionally greater change in the level of the mercury in the open end of the tube for a given change in pressure this end may be made smaller in area, as shown, than the area of the mercury surface at the upper or closed end of the column. The operation of the device will be understood and is briefly as follows: As the level of the mercury at $P_1$ rises or falls in response to variations in atmospheric pressure, rings or fringes seen by the observer at 13 travel inward or outward with respect to their center and thus minute changes of pressure may be observed. Furthermore the rate of pressure change in a given time may also be ascertained by means of this instrument by counting the rings as they travel across the field of observation and the number of rings passing in a given period of time will give the rate of change in atmospheric pressure for that period. It is believed to be of great significance and importance to meteorological science to know the rate of change in atmospheric pressure and so far as we are aware no practical instrumnt has hitherto been devised for exhibiting this, particularly for short periods of time.

While we have, for the purposes of explaining the principles of our invention and the means of practically applying the same, shown the specific examples above described and illustrated, it is to be understood that our invention or discovery is not limited to such as are herein particularly shown and described. Such specific instances are to be taken by way of illustration and explanation but not as restricting the invention thereto, as it will be obvious that various other applications of the same may be made, without departing from the invention, by those skilled in the art or science in which it is desired to apply it. Features and forms of our invention herein described and shown but not specifically claimed are not relinquished by us but we reserve all right to secure the same by further applications for Letters Patent therefor.

Having described our invention, we claim the following:

1. The method of detecting and observing variations of forces, which consists in applying the force to one of a pair of plates having light-reflecting surfaces mutually arranged to produce a system of light-interference bands, and responsively moving said plate by the action of said force to thereby produce a corresponding responsive movement of the bands, and illuminating said plates from a mercury vapor electric light.

2. The method of detecting and observing variations of forces, which consists in applying the force to plates having light-reflecting surfaces coöperatively arranged to produce a system of light-interference bands or fringes and responsively varying the mutual relation of said surfaces by the action of the applied force, illuminating said surfaces with actinic and substantially monochromatic light, and recording progressively the changes in the image of the bands on a photographic plate moving at predetermined speed.

3. The method of detecting and observing variations of forces, which consists in applying the force to plates having light-reflecting surfaces coöperatively arranged to produce a system of light-interference bands or fringes and responsively varying the mutual relation of said surfaces by the action of the applied force, illuminating said surfaces with a mercury vapor electric light, and recording progressively the changes in the image of the bands on a photographic plate moving at a predetermined speed.

4. An instrument for observing and detecting the operation of or changes in forces, which comprises a pair of plates having opposed light reflecting surfaces in such relation as to produce light interference fringes or bands, one of said plates being relatively fixed with respect to the other, a source of substantially monochromatic light, and transmitting means connected to the relatively movable plate for transmitting the forces to be observed thereto substantially as described.

5. An instrument for observing and detecting the operation of or changes in forces, comprising an oscillatory or vibratory diaphragm, a light reflecting surface on said diaphragm and partaking in all the movements thereof, an opposed light-reflecting surface relatively fixed with reference to the diaphragm and having such relation to the reflecting surface thereon as to produce a system of light-interference fringes or bands, a source of substantially monochromatic light, and means for transmitting the force to be observed to said diaphragm to cause the latter to oscillate or vibrate in response to the variations of the force.

6. An instrument for detecting the operation of or changes in forces, comprising a pair of light-reflecting surfaces in close proximity to one another and forming interference bands, means for transmitting the force to be observed to said surfaces to cause a movement thereof and a fixed point adjustably located with respect to said surfaces to form a center about which said surfaces are moved.

7. An instrument for observing and detecting the operation of, or changes in, forces, comprising two plates having opposed light-reflecting surfaces so arranged as to produce interference bands or fringes, and an oscillatory member supporting said plates, means for localizing a point on said plates about which said plates have a relative movement, and a connection between said oscillatory member and the force to be observed to cause said member to oscillate in response to said force.

8. An instrument for detecting and observing vibrations or oscillations, comprising the combination with a vibratory or oscillatory member, of a pair of light-reflecting elements for producing a system of light-interference bands or fringes, actuating connection between the vibratory or oscillatory member and one of said elements, and means for recording the resulting movements of the bands.

9. An instrument for detecting and observing vibratory or oscillatory movements which comprises the vibratory or oscillatory member, plates having light-reflecting surfaces arranged to produce interference fringes, an actuating connection between said plates and the said member and means to limit the movement of one of said plates at a localized area thereof with respect to the movement of the other plate.

10. An instrument for detecting and observing vibratory and oscillatory movements which comprises a vibratory or oscillatory member, plates having light-reflecting surfaces arranged to produce interference fringes, an actuating connection between said plates and the said member, means to locate a point in one of said surfaces, and means to hold said located point in fixed relation to the other surface whereby a relative movement of said surfaces is produced at said point.

11. Apparatus for recording photographically the operation or changes in forces, comprising the combination of plates having light-reflecting surfaces arranged to produce oscillatory interference bands, means operated by the force to be recorded for disturbing the said surfaces to produce oscillatory movement of the bands, a mercury vapor lamp or source of similar light for producing said bands, a photographic camera having a slit at its focus and means to move the sensitized surface adjacent said slit, and means for forming the image of the moving bands in said camera on the sensitized surface.

ALBERT C. CREHORE.
GEORGE O. SQUIER.

Witnesses as to the signature of Albert C. Crehore:
M. G. CRAWFORD,
H. C. WORKMAN.

Witnesses as to the signature of George O. Squier:
BENJ. R. JOHNSON,
THOMAS E. ROBERTSON.